(12) United States Patent
Cordts et al.

(10) Patent No.: US 7,114,303 B2
(45) Date of Patent: Oct. 3, 2006

(54) COVER ASSEMBLY FOR A THROUGH-PENETRATION

(75) Inventors: Brandon L. Cordts, Cottage Grove, MN (US); Stephen A. Miller, St. Paul, MN (US); Matthew D. Reier, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 10/295,081

(22) Filed: Nov. 15, 2002

(65) Prior Publication Data

US 2004/0093814 A1    May 20, 2004

(51) Int. Cl.
*E04C 2/52* (2006.01)

(52) U.S. Cl. .................. 52/220.8; 52/784.11

(58) Field of Classification Search ........... 52/220.8, 52/220.1, 784.11, 371
See application file for complete search history.

(56) References Cited

U.S. PATENT DOCUMENTS

| 4,102,321 A | 7/1978 | Githens |
| 4,304,079 A * | 12/1981 | Thorsten .................. 174/48 |
| 4,419,535 A | 12/1983 | O'Hara |
| 4,929,497 A | 5/1990 | Mitchell et al. |
| 5,067,676 A | 11/1991 | Beele |
| 5,326,060 A * | 7/1994 | Chubb et al. ............ 248/231.9 |
| 5,411,072 A | 5/1995 | Starck et al. |
| 5,782,690 A | 7/1998 | Gustafson et al. |
| 6,536,169 B1 * | 3/2003 | Dykhoff .................. 52/220.8 |

FOREIGN PATENT DOCUMENTS

| AU | 603845 | 11/1990 |
| DE | 36 40 319 A1 | 6/1988 |
| DE | 4319072 | * 12/1994 |
| GB | 416840 | 11/1936 |
| GB | 2 145 454 A | 3/1985 |

* cited by examiner

*Primary Examiner*—Milton Nelson, Jr.
(74) *Attorney, Agent, or Firm*—David B. Patchett

(57) ABSTRACT

A fire stopping apparatus for fire stopping a through-penetration includes fire stop material arranged within the through-penetration, a frame arranged adjacent the top opening of the through-penetration, and a plurality of slats arranged on the frame adjacent the through-penetration top opening.

12 Claims, 5 Drawing Sheets

COVER ASSEMBLY FOR A THROUGH-PENETRATION

FIELD OF THE INVENTION

The present invention relates generally to fire stopping and, more particularly, to a method and apparatus including an adjustable cover assembly for fire stopping a through-penetration in a wall, floor, or ceiling having items such as cables or wires passing there through.

BACKGROUND OF THE INVENTION

One mechanism by which smoke and fire may spread from one compartment of a building to another is through passages or openings, often referred to as through-penetrations, in floors, walls, ceilings, or the like. Such openings are provided to allow for the passage of cables, wires, pipes or the like within the building.

Current methods for preventing the spread of fire and passage of smoke through such openings use intumescent sheets that are cut to follow the contour of the penetrating cables. A bead of moldable intumescent putty is provided along the perimeter of the sheets. When the opening is contained in a floor, a cover plate is also typically installed over the opening. This is desirable for safety reasons, to prevent foot traffic damage to the fire stop material in the opening, and to prevent unwanted debris from entering the opening. The cover plate may also be a requirement of the fire stopping system While installations utilizing conventional cover plates are generally satisfactory for these purposes, they have shortcomings.

Existing cover plate designs require removal of the entire cover plate and profile cutting of the leading edge of the cover plate to conform to the contour of the items passing through the opening each time an item is added to the opening. And in the case where items are removed from the opening, the existing cover plate must be replaced with a completely new cover plate that has been cut to the necessary profile. In addition, current cover plates are installed using bolts/washers and various other components. The complexity of current installations increases the likelihood of improper installation due to misalignment and/or missing or lost parts.

Standard openings for the passage of cable in the telecommunications industry, for example, are generally 12 inches by 24 inches but may range up to 12 inches by as much as 72 inches. Materials used for the current cover plates include sheet goods made of steel, aluminum, or non-metallic composite boards up to ¼ inch thick. Thus, modification and/or replacement of such cover plates over the life of the opening can be a time consuming, expensive, and wasteful endeavor.

Due to the drawbacks and shortcomings of current cover plates, there exists a need in the industry for a method and apparatus for fire stopping a through-penetration that allows items passing through the opening to be readily added or removed. An adjustable cover that can be quickly and easily opened and closed can provide considerable long-term cost saving to fire stop users over currently available systems and techniques.

SUMMARY OF THE INVENTION

The present invention provides a method and apparatus for fire stopping an opening in a wall, floor, or the like that is adjustable to allow items passing through the opening to be quickly and easily added or removed. The present invention finds particular application, for example, in the telecommunications industry where openings in walls, floors, and ceilings for cable passage are prevalent, and cables are frequently added to or removed from the opening.

In one aspect, the present invention provides a cover assembly for a through-penetration having a top opening. The cover assembly includes a frame arranged adjacent the top opening of the through-penetration and a plurality of slats arranged on the frame adjacent the through-penetration top opening.

In another aspect, the present invention provides a method of fire stopping a through-penetration comprising the steps of arranging fire stop material within the through-penetration, arranging a frame adjacent the top opening of the through-penetration, and arranging a plurality of slats on the frame adjacent the through-penetration top opening.

In a specific embodiment, the present invention provides a cover assembly for a through-penetration having a top opening including a frame arranged adjacent the top opening of the through-penetration wherein the frame includes a main portion and a pair of parallel side portions extending perpendicularly from opposed ends of the main portion, a plurality of slats arranged on the frame in overlapping relation adjacent the through-penetration top opening, each slat including mating peaks and valleys to allow adjacent slats to be nested, and at least one side member arranged perpendicular to the slats along a side of the slats, wherein said cover assembly is secured to the through-penetration.

BRIEF DESCRIPTION OF THE DRAWINGS

The present invention will be further described with reference to the accompanying drawings, in which.

DETAILED DESCRIPTION

Figure 1:
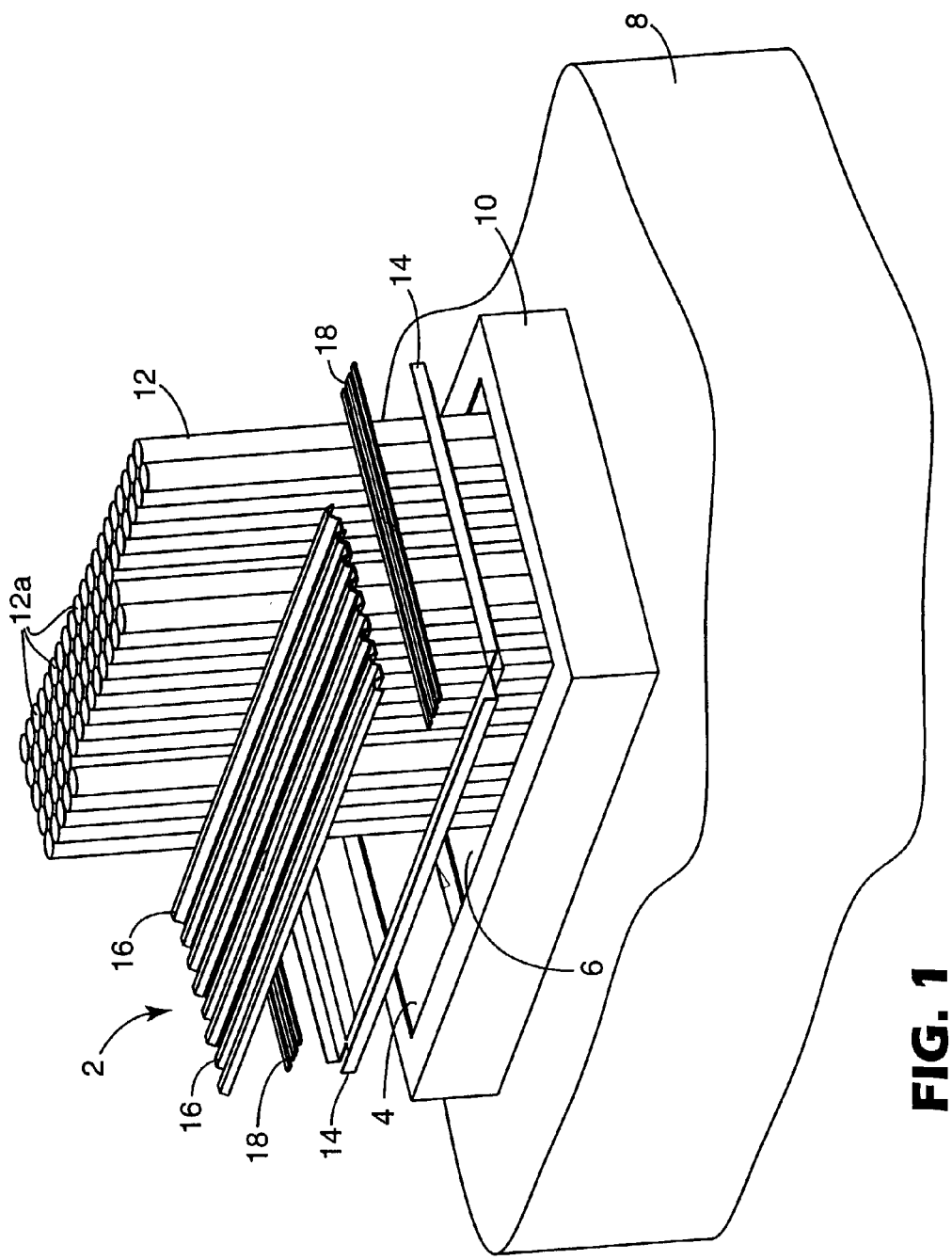
FIG. 1 is an exploded view of a through-floor penetration including a cover assembly according to the invention.

For the purpose of this invention, the following terms are used herein: "fire stop material" refers to intumescent, endothermic, and ablative materials useful in resisting the spread of fire and smoke from one compartment of a structure to another. A fire stop material may include an intumescent compound, an endothermic compound, or both an intumescent compound and an endothermic compound.

Referring now to the drawings, FIGS. 1–7 show a cover assembly 2 arranged adjacent the upper opening 4 of a through-penetration 6 in a partition 8 such as the floor of a building. The through-penetration 6 is shown with an optional riser 10 that is often installed on through-penetrations. A plurality of individual items 12a, such as bundle of cables, wires, or the like, form a bundle 12 that passes through the through-penetration 6.

Figure 2:
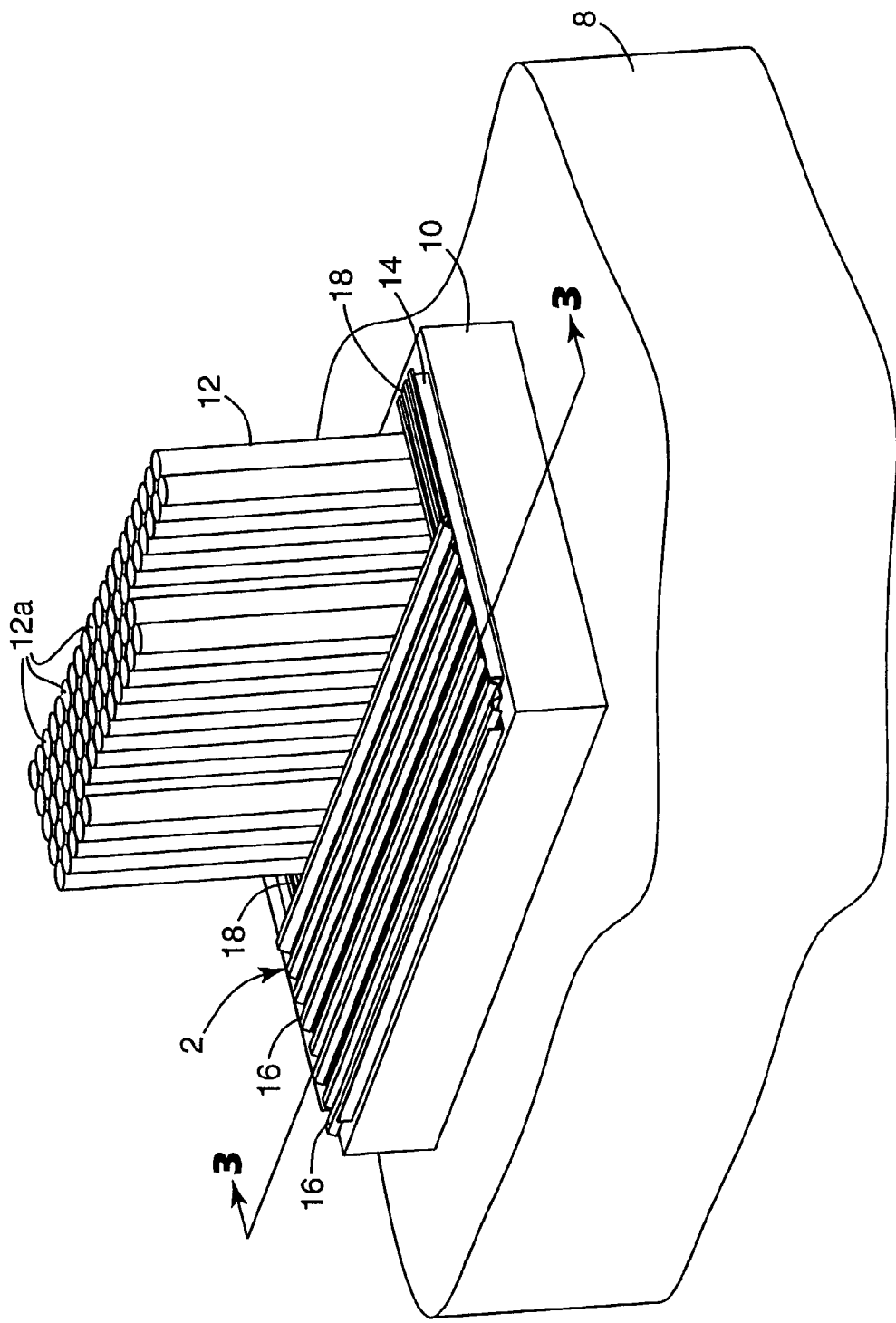
FIG. 2 is a perspective view of the through-floor penetration of FIG. 1 in its installed condition.

The cover assembly 2 includes a frame 14, a plurality of overlapping slats 16 arranged on the frame 14, and a pair of optional side members 18 that extend along opposite sides of the bundle 12. The side member 18 may be arranged either between the frame 14 and the slats 16 as shown in FIGS. 1 and 2, or on top of the slats 16. The slats 16 may optionally be individually fastened directly to the frame 14 or secured together to the frame 14 via the side member 18. The frame has a size and shape that fits securely into the upper opening 4 of the through-penetration 6.

Figure 4:
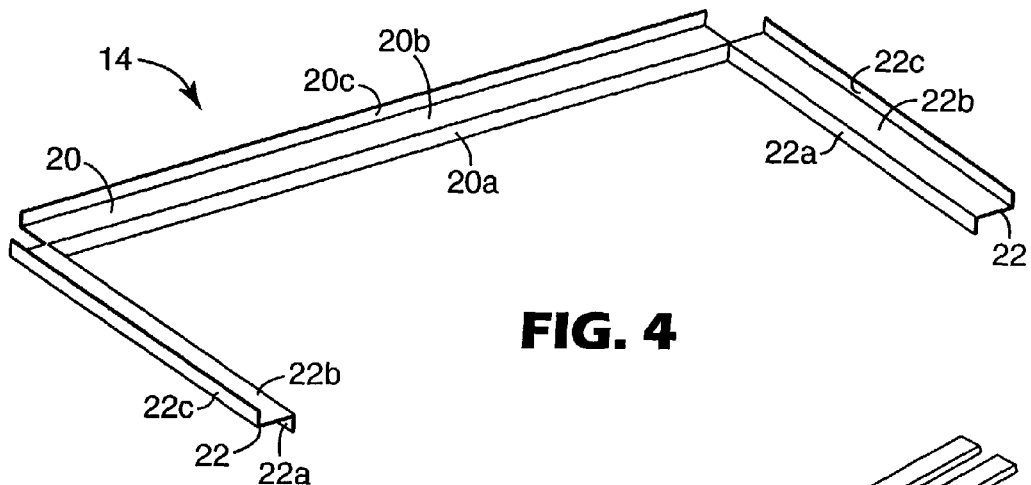
FIG. 4 is a perspective view of the cover assembly frame.
Figure 5:
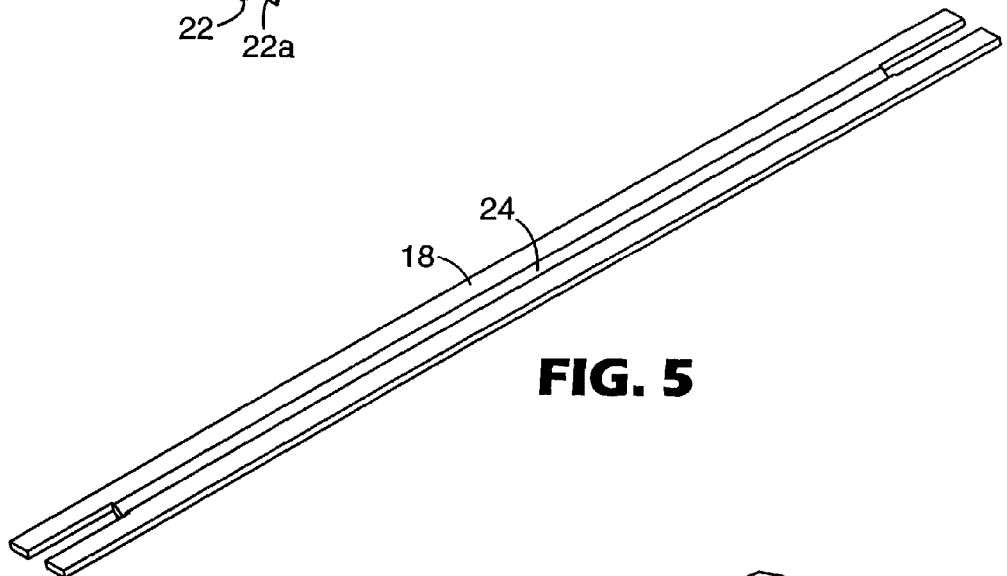
FIG. 5 is a perspective view of the cover assembly side members.
Figure 6:
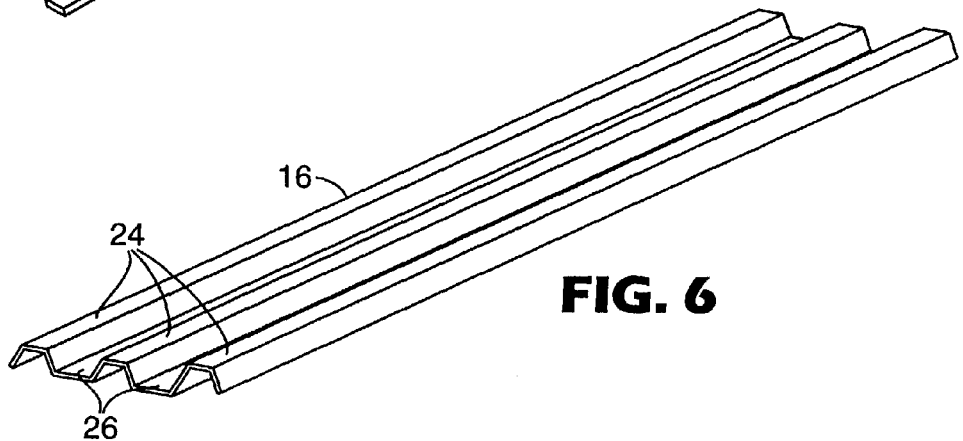
FIG. 6 is a perspective view of the cover assembly slat.
Figure 7:
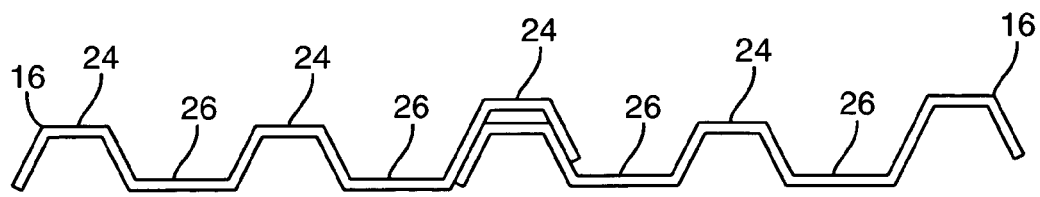
FIG. 7 is an end view of two slats arranged in overlapping relation.
Figure 8A:
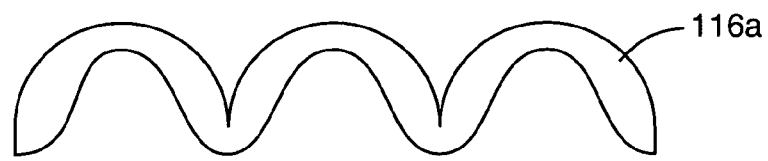
FIGS. 8a–8d are end views of alternate slat geometries.
Figure 8B:
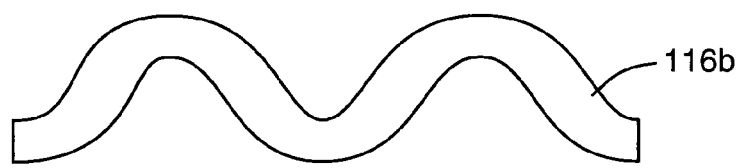
Figure 8C:
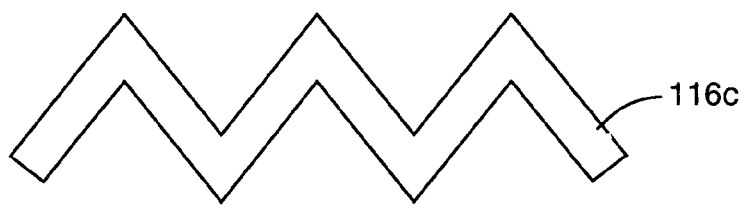
Figure 8D:
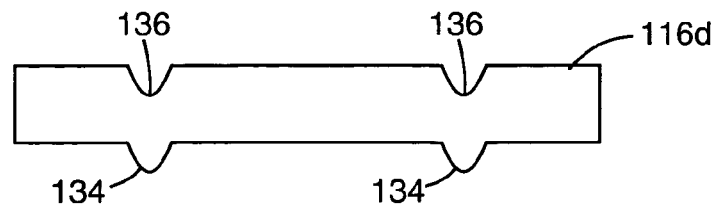

As shown in FIG. 4, the frame 14 includes a main portion 20 and a pair of parallel side portions 22 extending perpendicularly from opposed ends of the main portion. Each of the main portion 20 and side portions 22 include a lower lip portion 20a, 22a, respectively, a support portion 20b, 22b extending perpendicularly from an end of the lower lip portion 20a, 22a, respectively, and an upper lip portion 20c, 22c extending from an end of the support portion 20b, 22b opposite the lower lip portion 20a, 22a parallel to the lower lip portion 20a, 22a The lower lip portion 20a, 22a is designed to fit snugly into the upper opening 4 of the through-penetration to secure the frame 14 to the riser 10 or to partition 8 if riser 10 is not installed. The support portion 20b, 22b extends outwardly from the opening 8 and rests on the top surface of the partition 8. The upper lip portion 20c, 22c extends upwardly from the top surface of the partition to form a fence that serves to receive and retain the slats 16 and side member 18 within the frame 14.

The slats 16 are arranged in overlapping and interlocking relation with each other to firm a continuous but retractable cover for the opening 4. Each slat 16 is individually removable, thereby imparting the cover assembly 2 with the flexibility necessary to be used on through-penetration openings having various sizes, and allowing the cover assembly 2 to be quickly and easily opened and modified when items 12a are added to or removed from the bundle 12.

The slats 16 have a corrugated structure containing longitudinally extending alternating peaks 24 and valleys 26 that allow the slats 16 to be fully or partially nested on top of each other in interlocking relation. Partial nesting allows the slats 16 to be arranged in overlapping relation to completely cover and thereby fully close the opening 4 to protect it from foot traffic, and allows for full intermediate positioning of the cover depending on the size of the bundle 12. In addition, the slats 16 allow the through-penetration 6 to be fully opened for cable addition or removal.

To provide adequate coverage of the opening 4, the slats preferably have a width of from about 2 to 3 inches but smaller or larger widths may used for certain applications. Thus, the slats 16 provide a fully adjustable cover that affords users with increased flexibility that will provide considerable long-term cost savings to fire stop users.

Side members 18 are arranged adjacent opposite sides of the bundle 12 to cover the open area along the sides of the bundle. The side members preferably include a ridge 28 to improve their load bearing strength. The side members 18 may also have a nesting configuration similar to that of the slats 16 to prevent lateral movement of the side members 18. In addition, the slats 16 and side members 18 may include interlocking grooves, channels, ridges, or the like to prevent lateral movement between the slats 16 and side members 18. This is particularly desirable if the ends of the slats 16 are not attached to the frame 14.

The frame 14, slats 16, and side members 18 and preferably formed of metal, such as steel, having a thickness sufficient to support a load of 300 pounds at room temperature. Depending on the size of the open area along the sides of the bundle 12 to be covered, a plurality of side members may be used.

Figure 3:
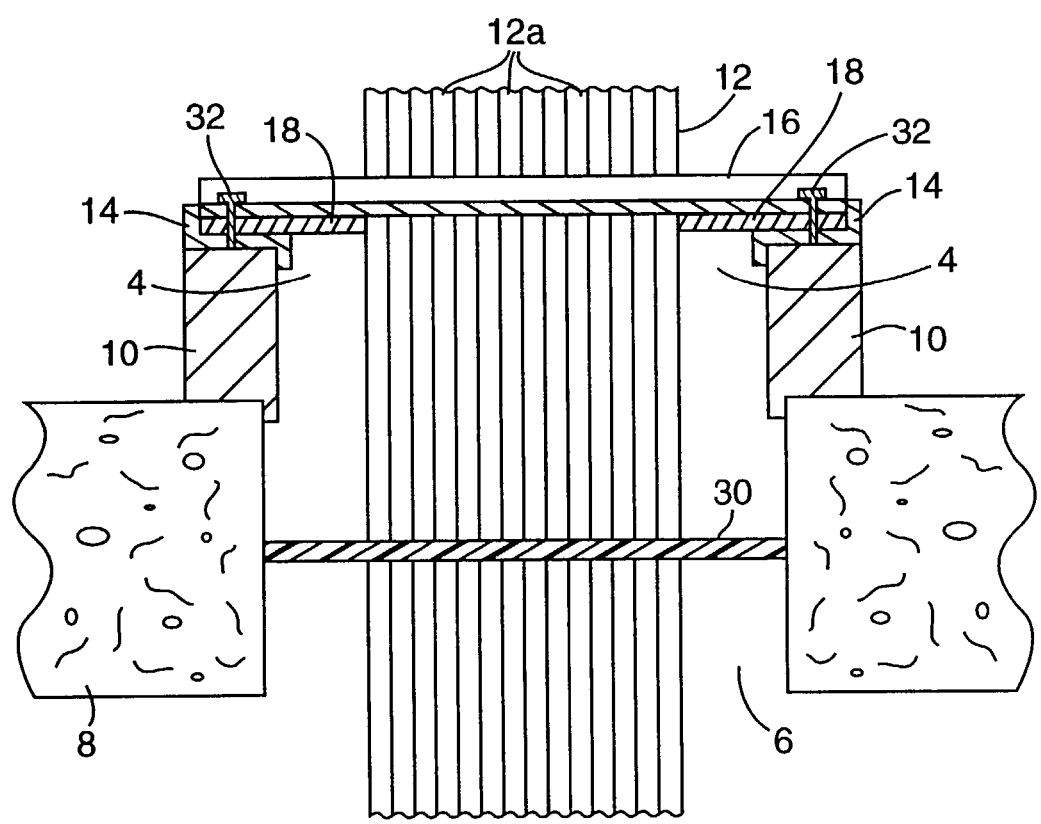
FIG. 3 is a sectional view taken along line 3—3 of FIG. 2.

As shown in FIG. 3, fire stop material 30 is arranged in the through-penetration 6 to provide a fire stopping barrier in the event of a fire or fire like conditions. The fire stop material 30 is typically a sheet or sheets of material that are cut to follow the contour of the penetrating cables. A bead of moldable intumescent putty is provided along the perimeter of the sheets.

The fire stop material may include an intumescent material, an endothermic material, a combination of intumescent material and endothermic material, and other conventional fire stop materials. The intumescent material contributes to the insulating ability of the fire stop material by increasing the total volume of the material and creating a generally tight seal around the item in the through-penetration.

The intumescent material provides for expansion of the fire stop material of the present invention in an unconfined state to at least about 1.5 times the original thickness of the material when exposed to fire-like conditions, preferably at least about three times its original thickness, more preferably, four times its original thickness. For some uses, it is preferable that the fire stop material expand to at least about nine times its original thickness. A preferred intumescent material is Interam™ Ultra GS, a graphite based, largely inorganic, flexible, fire resistive, intumescent mat available from the 3M Company, St. Paul, Minn.

Suitable endothermic materials include materials that thermally decompose, typically with the evolution of one or more small molecules such as ammonia, carbon dioxide, and/or water, which volatilize, or which react with one or more other compounds present within the fire stop material or the surrounding atmosphere in a manner which provides a net uptake of thermal energy by the system Suitable endothermic materials include inorganic compounds that provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4.6H_2O$), calcium sulfate ($CaSO_4.2H_2O$) also known as gypsum, magnesium ammonium phosphate ($MgNH_4PO_4.6H_2O$), magnesium hydroxide ($Mg(OH)_2$), and encapsulated $H_2O$. Preferred endothermic agents include magnesium ammonium phosphate hexahydrate, $MgO._2B_2O_3.9H_2O$, gypsum, and $MgHPO_4.3H_2O$.

As shown in FIG. 3, optional fasteners 32 may be used to secure the slats 16, side members 18, and frame 14 to the riser 10. If no riser is present, the slats 16, side member 18, and frame 14 may be secured directly to the partition 8. The fasteners also serve to lock the slats 16 and side members 18 in position and prevent any unwanted movement of these components. Suitable fasteners include screws, bolts, and other mechanical fasteners including latches, clips, or clamps. Captive fasteners that are permanently attached to the slat or frame are preferred because they will not get lost or fall into the through-penetration by accident. Hook and loop-type attachment devices may also be used.

FIGS. 8a–8d are end views of a number of alternative slat 116a, 116b, 116c, 116d geometries. Each geometry allows for partial or complete nesting of the slats. Slat 116a shown in FIG. 8a has an elongated hump-shaped configuration. The humps, however, need not be elongated. Slat 116b shown in FIG. 8b has a sinusoidal configuration. Slat 116c shown in FIG. 8c has a triangular configuration. It will be recognized that a wide variety of such repeating tapered geometries including, for example, a saw tooth geometry may be used. Slat 116d shown in FIG. 8d includes protrusions 134 on a first major surface that mate with corresponding indentations 136 on a second opposed major surface.

While such configurations are preferred because they ensure adequate overlap of adjacent slats and also because they interlock to prevent unwanted movement of the slats, it will be recognized that planar slats that do not overlap or interlock may also be used. Thus, in one embodiment (not shown), a plurality of planar slats are arranged in spaced relation on the frame 14 to close the opening 4 of the through penetration 6.

A through-penetration may be fire stopped using the cover assembly 2 by arranging fire stop material 30 in the through-penetration 6, arranging the frame 14 adjacent the top opening 4 of the through-penetration 6 which may or may not include a riser 10, and arranging a plurality of slats 16 on the frame 14 adjacent the through-penetration top opening 4. The frame may optionally be secured to the riser 10 or partition 6, and the slats 16 may optionally be secured to the frame 14. If the through-penetration 6 does not come equipped with a riser 10, a riser 10 can be provided as part of a kit including the other components of the cover assembly 2.

The through-penetration may further include an optional barrier (not shown) arranged within the through-penetration 6 below the cover assembly 2 to prevent the passage of smoke through the through-penetration. The barrier may be formed of a wide variety of gas or air impermeable materials including plastic films or foams such as closed cell foams. The barrier may be attached to the partition 8 or to the inner surface of the through-penetration 6 using a variety of conventional means including adhesive or mechanical fasteners.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A cover assembly for a through-penetration containing fire stop material, wherein the through-penetration has a top opening, said cover assembly comprising:
   (a) a frame arranged adjacent the top opening of the through-penetration; and
   (b) a plurality of longitudinal slats arranged on said frame, said slats having corresponding nesting features such that a first slat overlaps a second, adjacent laterally positioned slat and is overlapped by a third, adjacent laterally positioned slat, wherein said nesting features are configured to allow adjacent slats to be re-positioned laterally relative to one another between a fully nested arrangement and a partially nested arrangement.

2. A cover assembly as defined in claim 1, wherein each of said slats are arranged in overlapping relation relative to adjacent slats.

3. A cover assembly as defined in claim 2, wherein said slats are corrugated to allow adjacent slats to be nested.

4. A cover assembly as defined in claim 3, wherein said slats are individually removable.

5. A cover assembly as defined in claim 2, wherein said slats include mating protrusions and recesses for aligning overlapping slats.

6. A cover assembly as defined in claim 1, further comprising at least one side member arranged perpendicular to said slats along a side of said slats.

7. A cover assembly as defined in claim 1, wherein said slats are secured to said frame.

8. A cover assembly as defined in claim 1, wherein said frame and said slats are formed of metal.

9. A cover assembly for a through-penetration containing fire stop material, wherein the through-penetration has a top opening, said cover assembly comprising;
   (a) a frame configured to be positioned adjacent a top opening a through-penetration, wherein said frame includes a main portion and a pair of parallel side portions extending perpendicularly from opposed ends of said main portion; and
   (b) a plurality of slats arranged on said frame, said slats having corresponding nesting features such that a first slat overlaps a second, adjacently positioned slat and is overlapped by a third, adjacently positioned slat.

10. A cover assembly as defined in claim 9, wherein each said main portion and said side portion includes a lower lip portion for arrangement within said through-penetration, a support portion extending perpendicularly from an end of said lower lip portion, and an upper lip portion extending from an end of said support portion opposite said lower lip portion parallel to said lower lip portion.

11. A cover assembly for a through-penetration containing fire stop material, wherein the through-penetration has a top opening, said cover assembly comprising:
   (a) a frame configured to be positioned adjacent a top opening of a through-penetration; and
   (b) a plurality of slats arranged on said frame, said slats having corresponding nesting features such that a first slat overlaps a second, adjacently positioned slat and is overlapped by a third, adjacently positioned slat, wherein upon assembly to said frame, said slats combine to form a load bearing cover capable of supporting a load of at least 300 pounds at room temperature.

12. A cover assembly for a through-penetration having a top opening, said cover assembly comprising:
   (a) a frame configured to be positioned adjacent the top opening of a through-penetration, said frame including a main portion and a pair of parallel side portions extending perpendicularly from opposed ends of said main portion;
   (b) a plurality of slats arranged on said frame in overlapping relation, each said slat including mating peaks and valleys to allow adjacent slats to be nested; and
   (c) at least one side member arranged perpendicular to said slats along a side of said slats;
   wherein said cover assembly is secured to the through-penetration.

* * * * *

UNITED STATES PATENT AND TRADEMARK OFFICE
CERTIFICATE OF CORRECTION

PATENT NO. : 7,114,303 B2  
APPLICATION NO. : 10/295081  
DATED : October 3, 2006  
INVENTOR(S) : Brandon L. Cordts It is certified that error appears in the above-identified patent and that said Letters Patent is hereby corrected as shown below:

Column 5,  
Line 42, In Claim 1, delete "arranged" and insert -- configured to be positioned --, therefor.

Column 5,  
Line 42, In Claim 1, after "adjacent" delete "the" and insert -- a --, therefor.

Column 5,  
Line 42, In Claim 1, after "of" delete "the" and insert -- a --, therefor.

Column 6,  
Line 15, In Claim 9, after "opening" insert -- of --, therefor.

Column 6,  
Line 45 (Approx.), In Claim 12, delete "the" and insert -- a --, therefor.

Column 6,  
Line 55, In Claim 12, delete "secure to the" and insert -- adapted to be securable to a --, therefor.

Signed and Sealed this

Thirteenth Day of February, 2007

JON W. DUDAS  
*Director of the United States Patent and Trademark Office*